Oct. 31, 1961 — E. D. HAUK — 3,006,379
QUICK-CONNECT COUPLING APPARATUS CAPABLE OF
CONTAINING FLUIDS UNDER HIGH PRESSURES
Filed March 14, 1960 — 2 Sheets-Sheet 1

INVENTOR.
ERNEST D. HAUK
ATTORNEY.

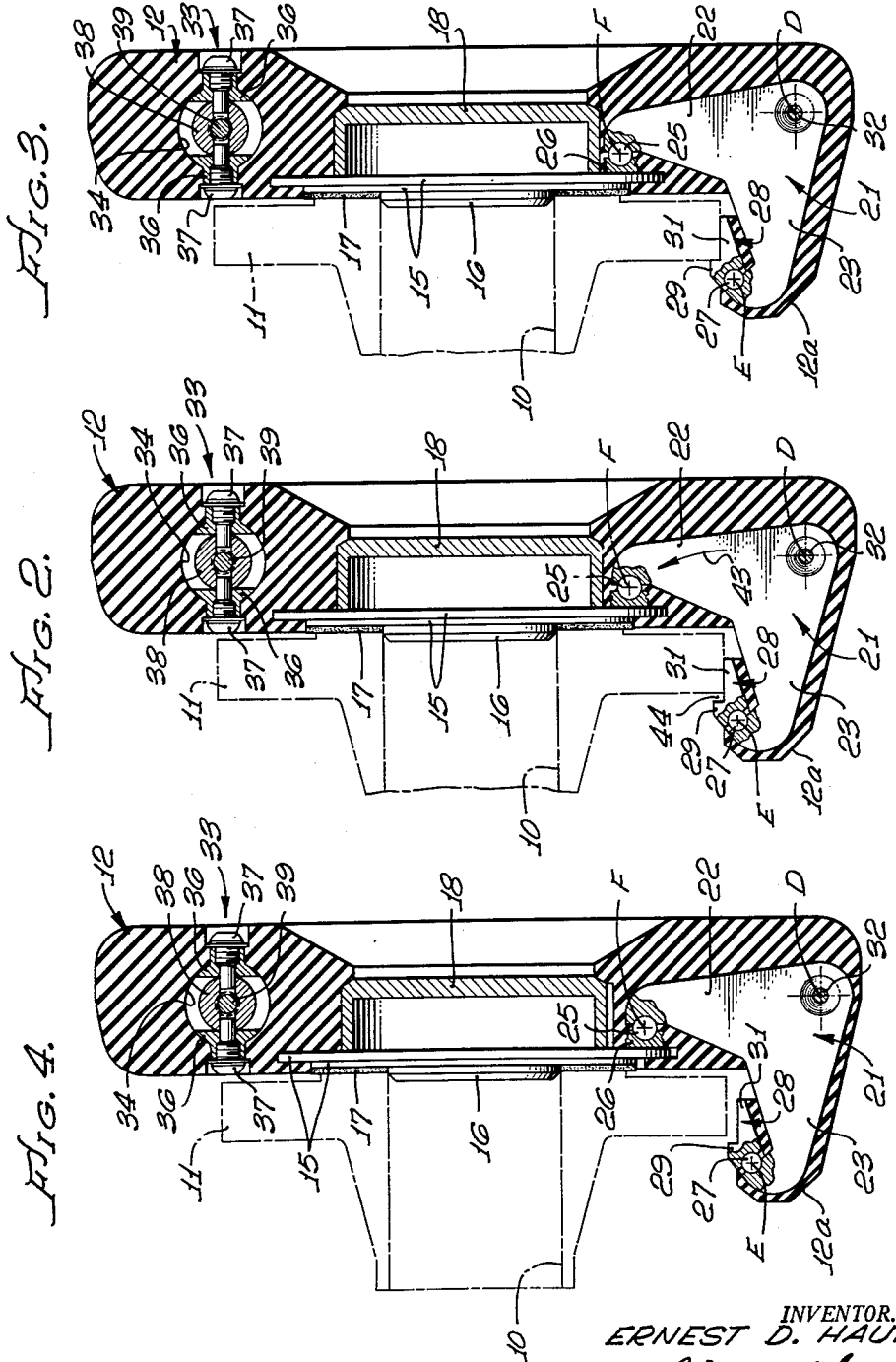

United States Patent Office 3,006,379
Patented Oct. 31, 1961

3,006,379
QUICK-CONNECT COUPLING APPARATUS CAPABLE OF CONTAINING FLUIDS UNDER HIGH PRESSURES
Ernest D. Hauk, 1315 E. 23rd St., Signal Hill 6, Calif., assignor of fifteen percent to Richard L. Gausewitz, Santa Ana, Calif.
Filed Mar. 14, 1960, Ser. No. 14,971
11 Claims. (Cl. 138—89)

This invention relates to a quick-connect coupling or cover apparatus adapted to be employed in conjunction with the flanges of pipes or the like in order to effect containment of fluids under high pressures.

The object of the present invention is to provide a relatively simple and economical coupling apparatus which may be connected and disconnected in a very short period of time by manipulating only a single arm, yet which is operable to contain fluids under extremely high pressures.

A further object of the invention is to provide a quick-connect coupling wherein generally circumferential forces are employed to effect pivotal movement of pivot elements in an axial direction, the relationship being such that very strong axial forces may be set up to effect sealing against high fluid pressures.

A further object is to provide a quick-connect coupler wherein a plurality of individual pivot elements are molded into an elastomeric body, such body also serving to contain a tension means for associating the pivot elements with each other.

These and other objects and advantages of the invention will be more fully set forth in the following specification and claims, considered in connection with the attached drawings to which they relate.

In the drawings:

FIGURE 2 is a longitudinal section taken on the broken line 2—2 of FIGURE 1;

FIGURE 3 is a longitudinal section corresponding to FIGURE 2 but illustrating the positions of the components when in fully closed and sealing positions;

Figure 5:
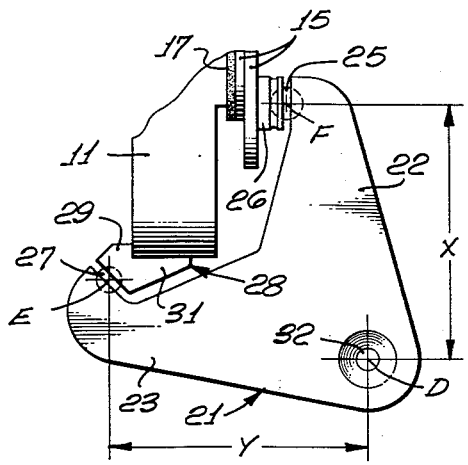

FIGURE 4 is a view corresponding to FIGURES 2 and 3 but illustrating the positions of the parts when in fully open positions permitting mounting of the apparatus around a pipe flange or removal of the apparatus therefrom; and FIGURE 5 is a schematic view corresponding generally to the lower portion of the showing of FIGURE 3 and indicating certain important relationships, the elastomer being unshown.

Referring to the drawings, the apparatus is illustrated as employed in closing and sealing the passage 10 through a flange element having a radial flange 11, such flange element being suitably associated with a string of pipe, a valve, etc. It is to be understood that the peripheral portion of flange 11 is cylindrical and coaxial with passage 10. It is also to be understood that the present apparatus may be employed to close and seal any conventional container apparatus having a flange or like means to provide a radial surface over which pivot elements may be hooked.

Figure 1:
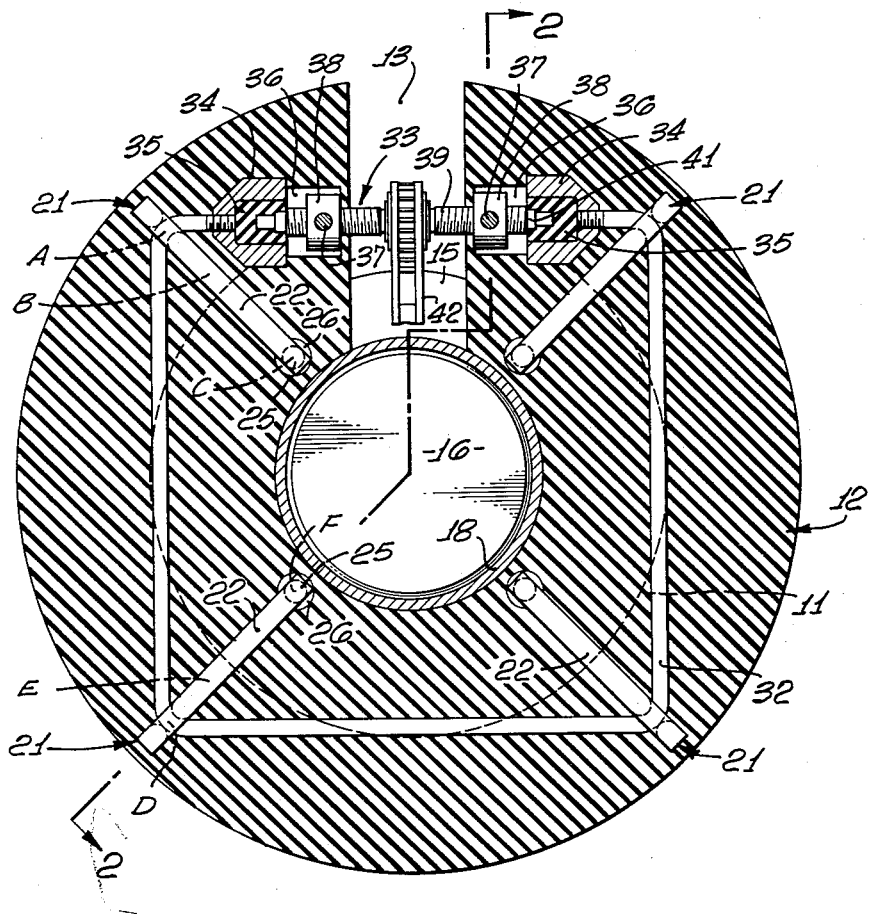
FIGURE 1 is a central sectional view taken transversely of the coupling apparatus, looking toward the left as viewed in FIGURES 2–4.

The apparatus comprises a generally annular body 12 formed of a suitable elastomeric material such as rubber, the body being split at only one point about the circumference thereof to provide the gap indicated at 13 in FIGURE 1. The inner portion of body 12 is formed with suitable annular grooves adapted to receive a disc-shaped cover or cap member 15 having a central protuberant portion 16 adapted to fit into the end of passage 10, such portion 16 being suitably beveled to facilitate insertion into the passage. Mounted on the face of the cover member 15, peripherally of portion 16, is a suitable gasket 17 adapted to seal against the flange element when axial pressure is exerted as will be stated hereinafter.

A generally cup-shaped element 18 may be suitably welded or otherwise secured to the inner surface of the disc-shaped cover or cap member 15. It is to be understood that the rigidly-connected elements 15, 16 and 18 are not bonded to the rubber body 12, so that it is possible for the body to be spread away from such elements in order to permit mounting of pivot elements over the flange 11. The internal annular grooves in body 12 are, however, sufficiently deep that normal spreading will not permit removal of the cover element 15 from body 12.

It is emphasized that, instead of being continuous and serving as a cap or cover, the element 15 may be open at its center and the elements 16 and 18 may be omitted, to create a flow path from passage 10 to a suitable conduit or container (not shown) connected to element 15. For example, flexible or rigid conduit elements, or a flange element, may be welded or otherwise sealingly secured to the inner surface of the member 15 around an opening therein, which opening may correspond in size to the passage 10. Under such conditions, it will be appreciated that the present apparatus serves as a coupling means instead of as a closure for the end of passage 10. The cap or cover 15 may be termed a backup means, or a rigid backup element for gasket 17.

Molded into the elastomeric body 12, and lying generally in planes containing the common axis of elements 12 and 15, are a plurality of generally pincer-shaped metal pivot elements 21. Each element 21 has a radially-inwardly extending finger 22 adapted to be associated with the inner surface of cap or cover disc 15, and also has a forwardly-extending finger 23 adapted to be associated with the radial surface of flange 11 which is farthest from or "opposite" such cap or cover 15.

In the illustrated embodiment, there are four such pivot elements 21 spaced at ninety-degree intervals about the axis of the apparatus, so that two diametrically-opposite pivot elements lie generally in the same plane which is perpendicular to a plane containing the remaining two diametrically-opposite pivot elements. It is to be understood that a substantially greater number of pivot elements 21 may be provided, for example six or eight such elements, which elements should be equally spaced circumferentially about the apparatus.

Each radially-inwardly extending finger 22 is disposed entirely within the main portion of the body 12, and has at its inner end a generally hemispherical seat for a metal ball bearing 25. Such bearing also seats in a generally hemispherical recess in a metal pad or support 26 which is in flatwise engagement with the peripheral portion of the inner surface of cap or cover disc 15. Sufficient clearance is provided between the finger 22 and the pad 26, which may be termed the cap pad, to permit substantial pivotal movement therebetween. It is to be understood that, as the apparatus is operated to the various positions to be described subsequently, the surface of the pad 26 slides on the inner surface of cap or cover 15.

Each forwardly-extending finger 23 is molded into a relatively small projecting portion 12a (FIGURES 2–4) of the elastomeric body, and terminates in a generally hemispherical seal for a bearing ball 27. The bearing 27 also seats in a generally hemispherical seat in a pad or support 28, which may be termed the flange pad, and which is shaped to hook over the peripheral portion of flange 11. Stated more definitely, pad 28 is shaped with a relatively small radially-inwardly extending portion 29 having a face adapted to engage the surface of flange 11 farthest from finger 22, and a long axial portion 31 adapted to seat on the cylindrical peripheral surface of flange 11. Such axial portion 31 should be relatively long in order to insure against undesired tilting action when strong axial pressures are applied to portion 29. Similarly to the case of pad 26 which is molded into the main portion of elastomeric body 12, each pad 28 is molded into a projecting portion 12a of the elastomeric body.

Referring particularly to FIGURE 5, it is pointed out that the two bearing balls 25 and 27 for each pivot element 21 should lie generally along a line which is disposed at approximately a forty-five degree angle relative to the axis of the apparatus. This assumes that the pads are relatively small, so that the balls are close to the portions of the pads which engage the cap 15 and flange 11, respectively.

Each of the pivot elements 21 has an opening through its apex portion, such opening being adapted to receive a corner of a metal tension rod 32 which is molded into the main portion of elastomeric body 12. In the illustrated apparatus having four pivot elements 21, the tension rod 32 is a square. If there were six such pivot elements 21, the rod would be a hexagon, and the rod would be an octagon if there were eight such elements, etc. Thus, the tension rod is an equilateral polygon. In each instance, a pivot element 21 is associated with the rod at a corner between two straight sides of such rod. To facilitate pivotal movement at such corner, the opening for the rod should be rounded and the rod should be cylindrical in shape.

Referring again to FIGURE 5, it is pointed out that the distance (designated Y) between each ball 27 and the associated opening for rod 32, taken parallel to the axis of the apparatus, should be substantially equal to the radial distance (designated X) between rod 32 and bearing ball 25. Also, bearing balls 25 and their pads 26 should lie between planes which are perpendicular to the axis of the apparatus and which contain, respectively, the rod 32 and the balls 27.

The tension rod 32 is continuous except at the gap 13 in elastomeric body 12, and means 33 are provided to move the opposed ends of the tension rod toward and away from each other in order to effect clamping and releasing operations as will be set forth in detail subsequently. It is pointed out that the means 33, and the pivot elements 21, are symmetrical about a plane containing the axis of the apparatus and disposed midway between the faces of body 12 in gap 13.

The means 33 is illustrated to comprise a ratchet and turnbuckle mechanism including yoke elements 34 respectively connected to the ends of tension rod 32 on opposite sides of gap 13. The yoke elements have generally cup-shaped base portions containing an elastomer such as the rubber indicated at 35. Formed integral with the base portion of each yoke element 34, on opposite sides of the recess containing rubber 35, are two trunnion blocks 36 having transverse passages therethrough adapted to receive trunnion screws 37 best shown in FIGURES 2-4. The inner ends of the screws 37 are unthreaded, and project rotatably into transverse openings in an internally threaded trunnion sleeve 38 disposed between the blocks 36.

The trunnion sleeves 38 on opposite sides of gap 13 are threaded in opposite directions, being adapted to receive the oppositely-threaded end portions of a turnbuckle screw 39. The extreme ends of screw 39 are unthreaded, as indicated at 41, being adapted to be inserted into undersize recesses in the rubber elements 35 described above. The turnbuckle screw 39 is turned by means of a standard ratchet arm or mechanism 42 containing the usual means (not shown) whereby the ratchet action may be altered to effect turning of the screw 39 in opposite directions as the ratchet arm is pivoted upwardly and downwardly through a desired angle. The spaces between the trunnion blocks 36 of each yoke 34 are free of rubber, but the remaining and external portions of such blocks are embedded in the body 12 of the apparatus.

Operation

The operation of the present apparatus is difficult to comprehend, particularly since the exact manner of pivoting of the pincer-shaped pivot elements 21 is hidden from view by the elastomeric body 12. An explanation will now be attempted, it being pointed out that the operation is symmetrical about the above-indicated vertical plane containing the axis of the device and extending through the gap 13 (FIGURE 1). Since the action is symmetrical, the explanation will only have reference (except when specifically stated) to the pivotal action of the pivot elements 21 at the left of such central plane, as viewed in FIGURE 1.

To facilitate reference to the various pivot points, the pivot point between the lower pivot element 21 and the tension rod 32 has been given the reference letter D. The pivot ball 27 for the same pivot element 21 has been given the reference letter E, and the pivot ball 25 therefor has been given the reference letter F. The corresponding pivot points relative to the upper pivot element 21 on the same side of the above-indicated central plane have been numbered A, B and C, respectively, as shown in FIGURE 1. Thus, point A is the pivot region between the tension rod 32 and the upper pivot element 21 on the left side of FIGURE 1, whereas B designates the ball 27 (not shown) for the same pivot element, and C designates the ball 25 for the same pivot element.

Let it be assumed that it is desired to associate the quick-coupling apparatus of the invention with a radial flange such as the one 11 illustrated in the drawing. The ratchet apparatus 42 is first set to such condition that pumping of the arm thereof will effect rotation of turnbuckle screw 39 in a direction effecting increased separation of the yoke 34 on one side of gap 13 relative to the yoke on the other side thereof. Such pumping may, if desired, be continued until the unthreaded ends 41 of the turnbuckle screw are disposed in the trunnion sleeves 38. The diameter of body 12 is thus increased substantially, to provide radial clearance permitting the portions 29 of flange pads 28 to be mounted around the flange 11 as illustrated in FIGURE 4. It is pointed out that, during such spreading operation, the rubber in the body 12 is pulled radially outwardly from the cap or cover 15, the cup element 18, etc. During mounting of the coupling apparatus adjacent the flange, the central protuberant portion 16 of the cap or cover 15 aligns the gasket 17 so that it is disposed coaxially around passage 10, and aids in properly positioning the flange pads 29.

The ratchet mechanism 42 is then adjusted to its opposite condition, such that pumping of the ratchet will cause rotation of turnbuckle screw 39 in such direction that the yokes 34 will be drawn toward each other. If the body 12 is initially spread sufficiently that turnbuckle screw 39 is unthreaded from trunnion sleeves 38, the unthreaded end portions 41 of such turnbuckle screw operate as pilots to cause the screw to become re-threaded with sleeves 38. The ratchet 42 is pumped until body 12 has decreased in diameter sufficiently to cause the axial portions 31 of flange pads 28 to seat on the peripheral cylindrical surface of flange 11, as shown in FIGURE 2. During such action, the ends 41 of the turnbuckle screw are forced into the undersize openings in the rubber means 35 disposed in the yokes 34, resulting in a force relationship which insures that the ratchet mechanism 42 will be operative at a subsequent time when it is desired to uncouple the apparatus from the flange.

The portions 31 of flange pads 28 seat on the peripheral flange surface with sufficient force that friction will prevent them from moving thereon through substantial distances. On the other hand, the cap pads 26 tend (as stated heretofore) to shift substantially on the inner surface of the cap or cover 15 during portions of the operation described below.

As the turnbuckle screw 39 continues to turn in the direction causing the yokes 34 to be drawn toward each other, the uppermost pivot element 21 (FIGURE 1) pivots about an axis containing the points B and C. This is because point A is moved to the right (FIGURE 1) due to operation of the turnbuckle screw 39, and (as stated above) the portion 31 of flange pad 28 is locked by friction on the peripheral cylindrical surface of the flange 11. Stated otherwise, point A is pulled to the right due to operation of the ratchet and turnbuckle mechanism 33, and point B is locked, thus pivoting must occur about the axis B—C.

As point A thus pivots about the axis B—C, it moves both upwardly (FIGURE 1) and inwardly (toward gap 13). An upward force is thus exerted on the portion of tension rod 32 between point A and point D, this force being directly transmitted due to the straight shape of such A—D section of the rod. The described force effects upward movement of point D. Such upward movement tends to cause pivoting of point D about an axis containing points E and F, just as point A was pivoted about the B—C axis due to operation of the turnbuckle and ratchet mechanism. As point D attempts to pivot upwardly about the E—F axis, it tends to move outwardly (to the left as viewed in FIGURE 1) as well as upwardly toward point A. It is emphasized, however, that point D may not move outwardly because it is being restrained by an equal and opposite force transmitted along the lower horizontal portion of tension rod 32 (FIGURE 1) from the opposite lower pivot element 21 (lower-right side of FIGURE 1).

Since point D is thus moving upwardly yet is prevented from moving outwardly (to the left in FIGURE 1), a force is created which causes point F to rotate about an axis through point E and generally tangential to the portion of flange 11 adjacent point E. The direction of rotation is counterclockwise as viewed in FIGURES 2 and 3, as indicated by the arrow 43 in FIGURE 2. The resulting relative axial movement between points E and F effects elimination of the axial clearance 44 (FIGURE 2) adjacent the outer radial surface of flange 11, so that the portion 29 of flange pad 28 eventually becomes seated on such outer radial surface of the flange, as illustrated in FIGURE 3.

Once the lower pivot element 21 is thus firmly in the position shown in FIGURE 3, point D becomes locked against substantial additional upward movement. Stated otherwise, both points E and F are now substantially locked, and point D may not move outwardly. It follows that point D may no longer move upwardly through a substantial distance.

Referring again to point A, it is pointed out that as such point is drawn to the right (FIGURE 1) due to additional operation of the ratchet and turnbuckle mechanism 33, point A is prevented from moving upwardly (as viewed in FIGURE 1) because of a force exerted along the portion A—D of the tension rod 32 from point D, the latter point now being locked as stated in the previous paragraph. Accordingly, similarly to the case of the lower pivot element 21 associated with points D—E—F, point C is caused to pivot about an axis through point B and generally tangential to the portion of flange 11 adjacent point B. Thus, relative movement occurs between points B and C, axially of the apparatus, to eliminate the axial clearance (corresponding to clearance 44 shown in FIGURE 2) adjacent the pivot element 21 containing points A—B—C. As stated above, similar actions occur relative to the pivot elements 21 on the right side of the central plane, as viewed in FIGURE 1.

The result is that the circumferential forces set up in tension rod 32 due to operation of mechanism 33 effect pivoting of the elements 21 in such directions and through such angles that uniform axial pressures are set up. Such axial pressures not only eliminate the clearance 44 (FIGURE 2) to achieve the closed position shown in FIGURE 3, but become much greater when the ratchet is pumped additionally. Such axial forces become so great, and are so uniform, that an excellent seal will be created at gasket 17. Furthermore, the apparatus is mounted with sufficient strength that it will not be blown off the flange 11 even though a conventional pipe connected to flange 11 is pressure tested to failure.

To remove the apparatus from the flange 11, it is merely necessary to change the setting of the ratchet mechanism 42 so that pumping thereof causes turning of turnbuckle screw 39 in a direction causing the yokes 34 to move apart as distinguished from together. In the described manner, the apparatus may be mounted on or removed from a flange in a short period of time, such as 10 or 20 seconds, yet the cover is mounted as strongly as if a complicated bolt assembly were employed.

Various embodiments of the present invention, in addition to what has been illustrated and described in detail, may be employed without departing from the scope of the accompanying claims.

I claim:

1. A quick-connect coupling and closure apparatus adapted to be associated with the flanges of pipes, vessels, valves, and the like, which apparatus comprises a backup element adapted to be forced axially against a flanged element, a substantial number of pivot elements each having one portion adapted to apply pressure to said backup element axially toward the end face of said flanged element and another portion adapted to apply pressure to a generally radial opposite surface of said flanged element, means to mount said pivot elements in spaced relation about the peripheral portion of said backup element and in such manner that each of said pivot elements may pivot about a plurality of axes, a substantially closed elongated tension element pivotally associated with all of said pivot elements and being continuous except for a gap between the end portions of said tension element, said tension element and said pivot elements being so constructed and associated that movement of said end portions of said tension element toward each other effects pivotal movement of said pivot elements in such directions that said portions of said pivot elements force said backup element and flanged element toward each other, and means to draw said end portions of said tension element toward each other.

2. The invention as claimed in claim 1, in which said means to mount said pivot elements comprises a mass of elastomeric material molded around said pivot elements and around said tension element.

3. The invention as claimed in claim 1, in which said tension element is a metal rod shaped as an equilateral polygon, and in which said pivot elements are pivotally associated with said metal rod at the corners between adjacent straight sides of said polygon.

4. The invention as claimed in claim 3, in which each of said pivot elements lies generally in a plane which bisects the angle between said adjacent straight sides of said polygon.

5. A quick-connect and quick-disconnect coupling and closure apparatus adapted to be mounted against one end of a flanged element having an opening therein and an annular flange provided around said element and concentric with said opening, said apparatus comprising an annular body formed of elastomeric material and being split at one point about the circumference thereof to provide a gap therein, a rigid backup element mounted coaxially in said body, said backup element having a surface adapted to support a gasket, a substantial number of unitary metal pivot elements molded into said body in spaced relationship about the circumference thereof, each of said pivot elements lying generally in a plane containing the axis of said body and having a generally radially-inwardly extending portion adapted to apply pressure to the inner surface of said backup element and a generally axially-extending portion adapted to apply pressure to a radial surface of said flange opposite from said backup element, a metal rod bent into the shape of a polygon and split at only one point about the circumference thereof at a location corresponding generally to said gap in said body, the corner portions of said rod being pivotally associated with said pivot elements, and means connected between the end portions of said rod at said gap in said body to draw said rod end portions together, thereby effecting pivotal movement of said pivot elements to cause said portions of said pivot elements to apply pressure to the inner surface of said backup element and to the opposite radial surface of said flange in opposite directions, respectively, and axially of said body to thereby compress said gasket between said backup element and said flanged element.

6. The invention as claimed in claim 5, in which said backup element is mounted freely in an internal groove in said elastomeric body, the depth of said groove and the diameter of said backup element being sufficient that said elastomeric body may be increased substantially in diameter due to operation of said last-named means without permitting said backup element to fall from said body.

7. The invention as claimed in claim 5, in which a bearing ball is rotatably mounted in the two distal portions of each of said pivot elements, in which a metal pad is rotatably mounted on each of said bearing balls, the metal pads being adapted respectively to engage the inner surface of said backup element and the opposite surface of said radial flange surface.

8. The invention as claimed in claim 5, in which the dimension radially of said body between the point of pivotal association of each pivot element with said rod and the region of engagement between such pivot element and said backup element is generally equal to the dimension axially of said body between said point of association and the region of engagement between such pivot element and said radial flange surface.

9. The invention as claimed in claim 5, in which the region of engagement between each pivot element and said backup element is disposed between planes which are perpendicular to the axis of said elastomeric body and which contain, respectively, the region of engagement between each pivot element and said flange and the point of pivotal association between each pivot element and said rod.

10. A quick-connect and quick-disconnect coupling apparatus adapted to be mounted over the end of a conduit means or the like, said conduit means having an annular flange therearound and concentric therewith, which apparatus comprises a relatively thick annular body formed of elastomeric material and split at only one point about the circumference thereof to provide a gap therein, said body having an interior annular groove, an annular metal backup element mounted in said body and seated in said annular groove, a gasket mounted on one surface of said backup element and adapted when forced against said flanged conduit to form a seal therewith, a strong metal tension rod shaped as an equilateral polygon and molded coaxially into said elastomeric body, said rod being continuous except for a single split therein coincident with said gap in said body, a plurality of integral metal pivot elements each having an opening therethrough adapted to receive a corner portion of said rod in freely pivotal and tilting relationship, said pivot elements lying generally in planes containing the axis of said body, each of said pivot elements having a radially-inwardly extending finger and a generally axially-extending finger, a backup pad molded into said elastomeric body immediately adjacent said backup element near each of said pivot elements, a bearing ball seated rotatably in said backup pad and in the inner end portion of each radially-inwardly extending finger, a flange pad adapted to seat over the peripheral portion of said flange opposite the flange face and molded into said body adjacent each of said pivot elements, a bearing ball rotatably seated in each of said flange pads and in the adjacent end portion of said axially-extending finger of each pivot element, and means to move the end portions of said tension rod together to thereby effect compound pivotal movement of said pivot elements in directions causing compression of said gasket.

11. The invention as claimed in claim 10, in which said last-named means comprises a ratchet and turnbuckle mechanism.

References Cited in the file of this patent
UNITED STATES PATENTS

| | | |
|---|---|---|
| 1,890,061 | Lefkowitz | Dec. 6, 1932 |
| 2,536,602 | Goett | Jan. 2, 1951 |
| 2,634,927 | Smith | Apr. 14, 1953 |
| 2,645,506 | Sturgis | July 14, 1953 |